(12) United States Patent
Hartness

(10) Patent No.: US 9,914,190 B2
(45) Date of Patent: Mar. 13, 2018

(54) BLAST GATE FOR VACUUM SYSTEM

(71) Applicant: Robert G. Hartness, Greer, SC (US)

(72) Inventor: Robert G. Hartness, Greer, SC (US)

( * ) Notice: Subject to any disclaimer, the term of this patent is extended or adjusted under 35 U.S.C. 154(b) by 0 days.

(21) Appl. No.: 15/175,184

(22) Filed: Jun. 7, 2016

(65) Prior Publication Data

US 2017/0348813 A1 Dec. 7, 2017

(51) Int. Cl.
| | | |
|---|---|---|
| A47L 5/22 | (2006.01) | |
| B23Q 11/00 | (2006.01) | |
| F16K 3/02 | (2006.01) | |
| F16K 31/04 | (2006.01) | |
| F16K 25/00 | (2006.01) | |
| F16K 3/314 | (2006.01) | |

(52) U.S. Cl.
CPC ...... *B23Q 11/0046* (2013.01); *B23Q 11/0057* (2013.01); *F16K 3/02* (2013.01); *F16K 3/314* (2013.01); *F16K 25/005* (2013.01); *F16K 31/042* (2013.01); *F16K 31/043* (2013.01)

(58) Field of Classification Search
CPC ... B23Q 11/0046; B23Q 11/0057; F16K 3/02; F16K 3/314; F16K 25/005; F16K 31/042; F16K 31/043; Y10T 137/86533
See application file for complete search history.

(56) References Cited

U.S. PATENT DOCUMENTS

| | | | | |
|---|---|---|---|---|
| 1,798,952 A | * | 3/1931 | Pellegrino | F16K 3/085 251/112 |
| 2,722,396 A | * | 11/1955 | Carr | F16K 31/048 251/229 |
| 3,424,200 A | * | 1/1969 | Marley | F16K 3/312 137/625.31 |
| 4,977,638 A | * | 12/1990 | Best | A47L 7/0095 144/252.1 |
| 6,012,199 A | | 1/2000 | Litomisky et al. | |
| 6,691,981 B1 | * | 2/2004 | Hart | F16K 3/085 251/302 |
| 7,146,677 B2 | * | 12/2006 | Litomisky | A47L 5/38 15/301 |
| 7,353,936 B2 | * | 4/2008 | Berry | B23Q 11/0057 198/518 |
| 7,901,164 B2 | * | 3/2011 | Skradski | B23Q 11/0046 175/209 |
| 8,074,962 B1 | * | 12/2011 | Krohmer | F16K 3/0281 251/146 |
| 8,695,624 B2 | * | 4/2014 | Hopf | A61M 39/223 137/315.09 |

(Continued)

*Primary Examiner* — Craig Schneider
*Assistant Examiner* — Kevin Barss
(74) *Attorney, Agent, or Firm* — Dority & Manning, P.A.

(57) ABSTRACT

A blast gate for a vacuum system includes a chassis connectable to a duct and defining a flow passage therethrough, and a gate connected to the chassis and rotatable about a central axis. The gate includes a first portion, an intermediate portion and a second portion spaced apart circumferentially about the central axis. The first portion defines a flow aperture, the intermediate portion defines an auxiliary flow aperture, and the second portion includes a partition. Each of the first portion, second portion and third portion is selectively rotatable into fluid alignment with the flow passage. The blast gate further includes a motor connected to the gate and selectively operable to rotate the gate about the central axis.

19 Claims, 7 Drawing Sheets

(56) References Cited

U.S. PATENT DOCUMENTS

| | | | |
|---|---|---|---|
| 8,695,637 B2* | 4/2014 | McBride | F16K 39/04 |
| | | | 137/629 |
| 9,010,370 B2* | 4/2015 | Isenhour | F16K 3/30 |
| | | | 137/625.15 |
| 9,249,892 B2* | 2/2016 | Klippert | H02K 7/10 |
| 9,657,958 B2* | 5/2017 | Litomisky | F24F 11/0001 |
| 2006/0042037 A1* | 3/2006 | Van Norden | A47L 9/104 |
| | | | 15/314 |
| 2012/0066860 A1* | 3/2012 | Coleman | B23Q 11/0046 |
| | | | 15/339 |

\* cited by examiner

BLAST GATE FOR VACUUM SYSTEM

FIELD OF THE INVENTION

The present disclosure relates generally to vacuum systems, such as for machine shops, and more particularly to improved blast gates for use in such vacuum systems.

BACKGROUND OF THE INVENTION

In machine shops, woodworking shops, and the like, work pieces are milled, lathed, drilled, formed, etc. to achieve the ends of the craft. In altering the structure of the workpiece, dust, filings and/or tailings are created. For example, when sawing a piece of wood, sawdust will collect adjacent the area of the saw blade. Likewise, for lathing or milling processes, shavings or tailings from the metal workpiece about or below the cutting blade.

The sawdust and/or metal shavings that collect in the workshop can be a nuisance and potentially dangerous. The debris can cling to clothes, machines and tools utilized in the shop, and other areas of the shop. Further, some debris may become airborne and inhaled deeply into the lungs of persons in the general vicinity. Additionally, thick suspensions of dust become fire or explosion hazards as an explosion or fire may occur if the dust comes into contact with a spark of flame.

Prior attempts to eliminate sawdust, metal shavings, and the like from the machine shop work area have used a centralized vacuum system where a central vacuum motor pulls a vacuum through a series of ducts. The end of the ducts are open adjacent the machine areas where debris collect. The debris then travels through the ductwork to a collection or storage bin that is emptied on a periodic basis. Further, blast gates have been utilized to control the flow of air through the ductwork so that a vacuum or suction is only pulled in areas where actual work is being done. This eliminates the energy waste associated with the vacuuming of otherwise clean and dust free areas. It also reduces the load the vacuum has to pull.

However, presently known blast gates have various disadvantages. Some known blast gates are simply manually-controlled, with a partition that can be manually moved into and out of the flow path of air through a duct. Other blast gates have automated this process. However, known blast gates, whether manual or automated, do not effectively deal with debris build-up and clogging. Debris may remain within and surrounding a blast gate after use of the vacuum system, thus requiring frequent cleaning of the blast gate and vacuum system.

Accordingly, improved vacuum systems and blast gates therefor are desired. In particular, blast gates which provide improved mechanical debris scrubbing to reduce debris build-up and clogging would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a blast gate for a vacuum system is provided. The vacuum system includes a duct. The blast gate includes a chassis connectable to the duct and defining a flow passage therethrough, and a gate connected to the chassis and rotatable about a central axis. The gate includes a first portion, an intermediate portion and a second portion spaced apart circumferentially about the central axis. The first portion defines a flow aperture, the intermediate portion defines an auxiliary flow aperture, and the second portion includes a partition. Each of the first portion, second portion and intermediate portion is selectively rotatable into fluid alignment with the flow passage. The blast gate further includes a motor connected to the gate and selectively operable to rotate the gate about the central axis. The gate is rotatable between a stationary first position wherein the first portion is in fluid alignment with the flow passage and a stationary second position wherein the second portion is in fluid alignment with the flow passage. The gate is rotatable through an intermediate position wherein the intermediate portion is in fluid alignment with the flow passage during rotation from the first position to the second position.

In accordance with another embodiment, a vacuum system is provided. The vacuum system includes a vacuum, a duct, and a blast gate connected to the duct. The blast gate includes a chassis connected to the duct and defining a flow passage therethrough, and a gate connected to the chassis and rotatable about a central axis. The gate includes a first portion, an intermediate portion and a second portion spaced apart circumferentially about the central axis. The first portion defines a flow aperture, the intermediate portion defines an auxiliary flow aperture, and the second portion includes a partition. Each of the first portion, second portion and intermediate portion is selectively rotatable into fluid alignment with the flow passage. The blast gate further includes a motor connected to the gate and selectively operable to rotate the gate about the central axis. The gate is rotatable between a stationary first position wherein the first portion is in fluid alignment with the flow passage and a stationary second position wherein the second portion is in fluid alignment with the flow passage. The gate is rotatable through an intermediate position wherein the intermediate portion is in fluid alignment with the flow passage during rotation from the first position to the second position. The gate includes a first portion, an intermediate portion and a second portion spaced apart circumferentially about the central axis. The first portion defines a flow aperture, the intermediate portion defines an auxiliary flow aperture, and the second portion includes a partition. Each of the first portion, second portion and third portion is selectively rotatable into fluid alignment with the flow passage. The blast gate further includes a motor connected to the gate and selectively operable to rotate the gate about the central axis. The gate is rotatable between a stationary first position wherein the first portion is in fluid alignment with the flow passage and a stationary second position wherein the second portion is in fluid alignment with the flow passage. The gate is rotatable through an intermediate position wherein the intermediate portion is in fluid alignment with the flow passage during rotation from the first position to the second position.

In some embodiments, a blast gate further includes an electrical assembly in electrical communication with the motor. The electrical assembly includes a relay and a plurality of switches, each of the plurality of switches comprising a contact arm, the contact arm of each of the plurality of switches selectively contactable with a peripheral edge of the gate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
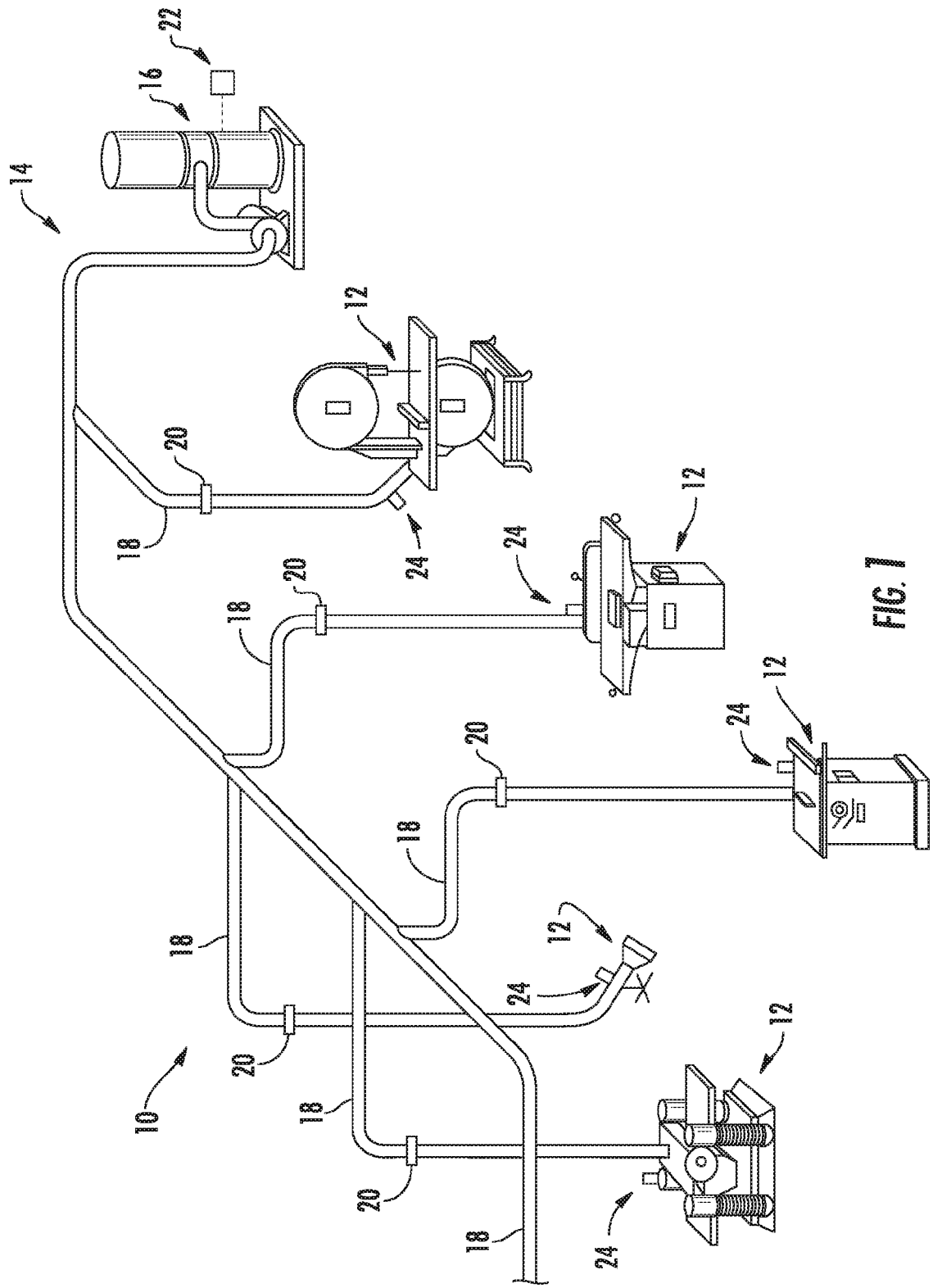
FIG. 1 is a perspective view of a debris collection system in accordance with embodiments of the present disclosure.
Figure 2:
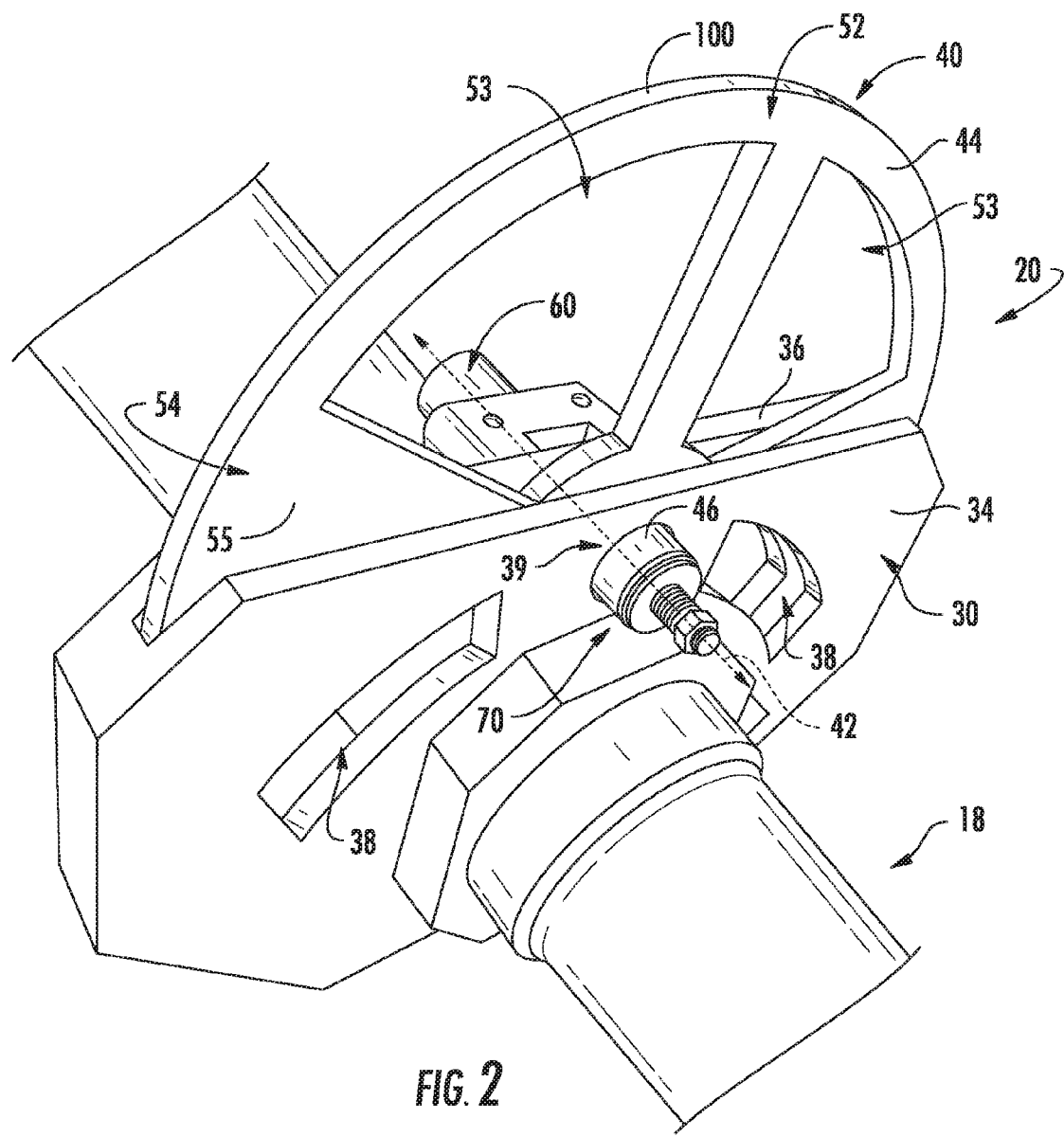
FIG. 2 is a front perspective view of a blast gate connected to a duct in a vacuum system in accordance with embodiments of the present disclosure.
Figure 3:
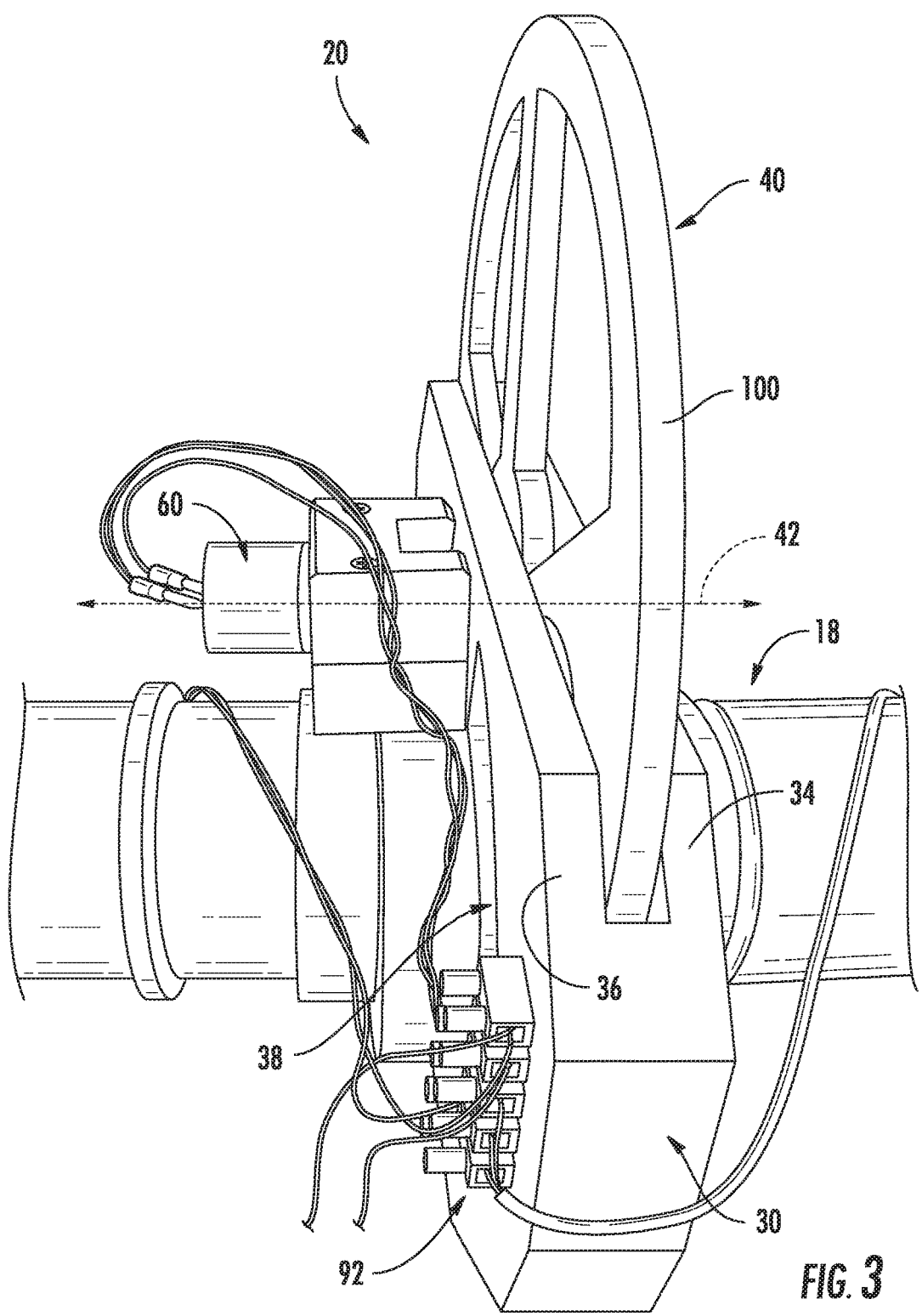
FIG. 3 is a side view of a blast gate connected to a duct in a vacuum system in accordance with embodiments of the present disclosure.
Figure 4:
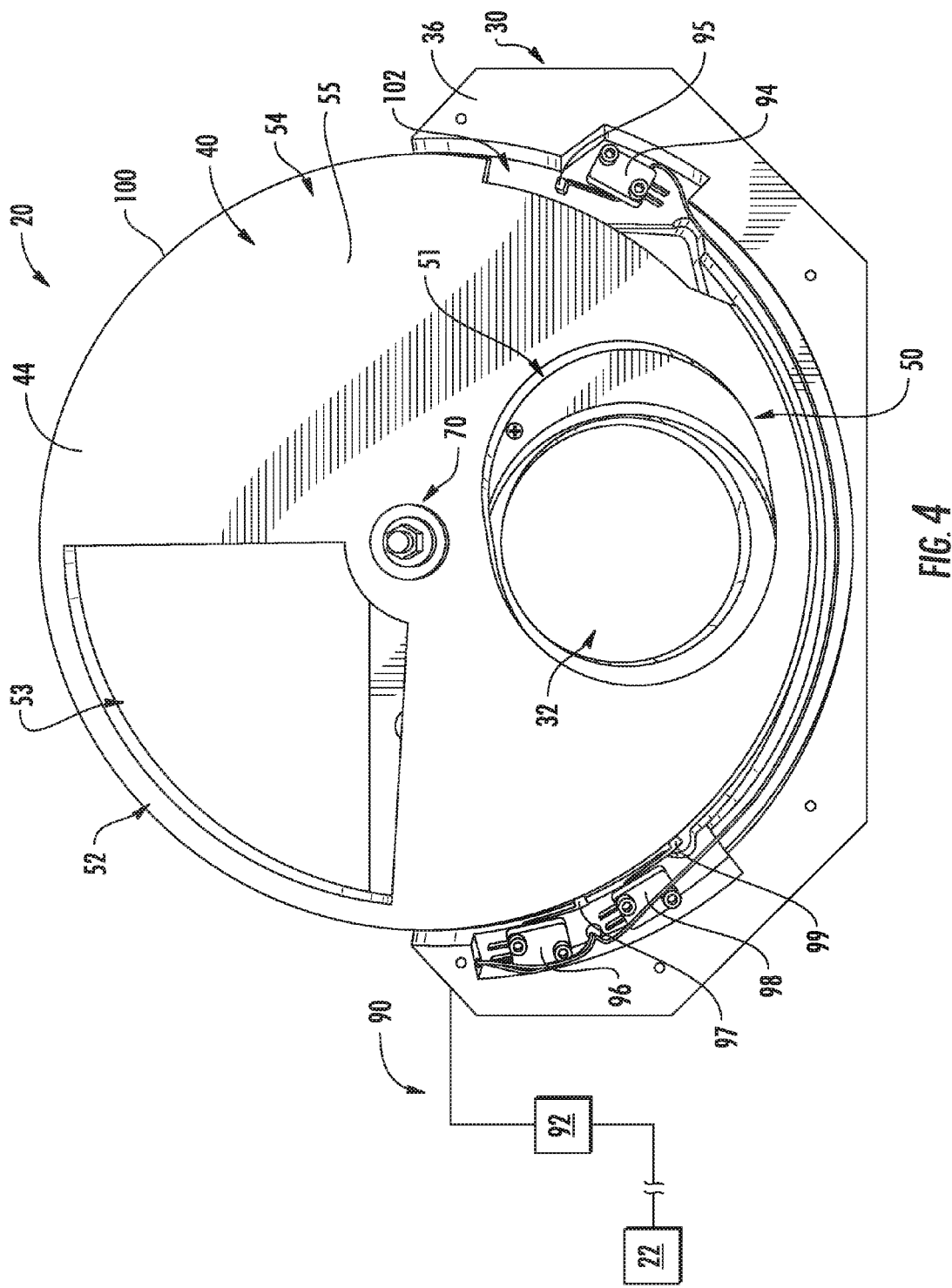
FIG. 4 is a rear view of components of a blast gate, with a portion of the chassis removed for illustrative purposes and a gate in a first position, in accordance with embodiments of the present disclosure.
Figure 5:
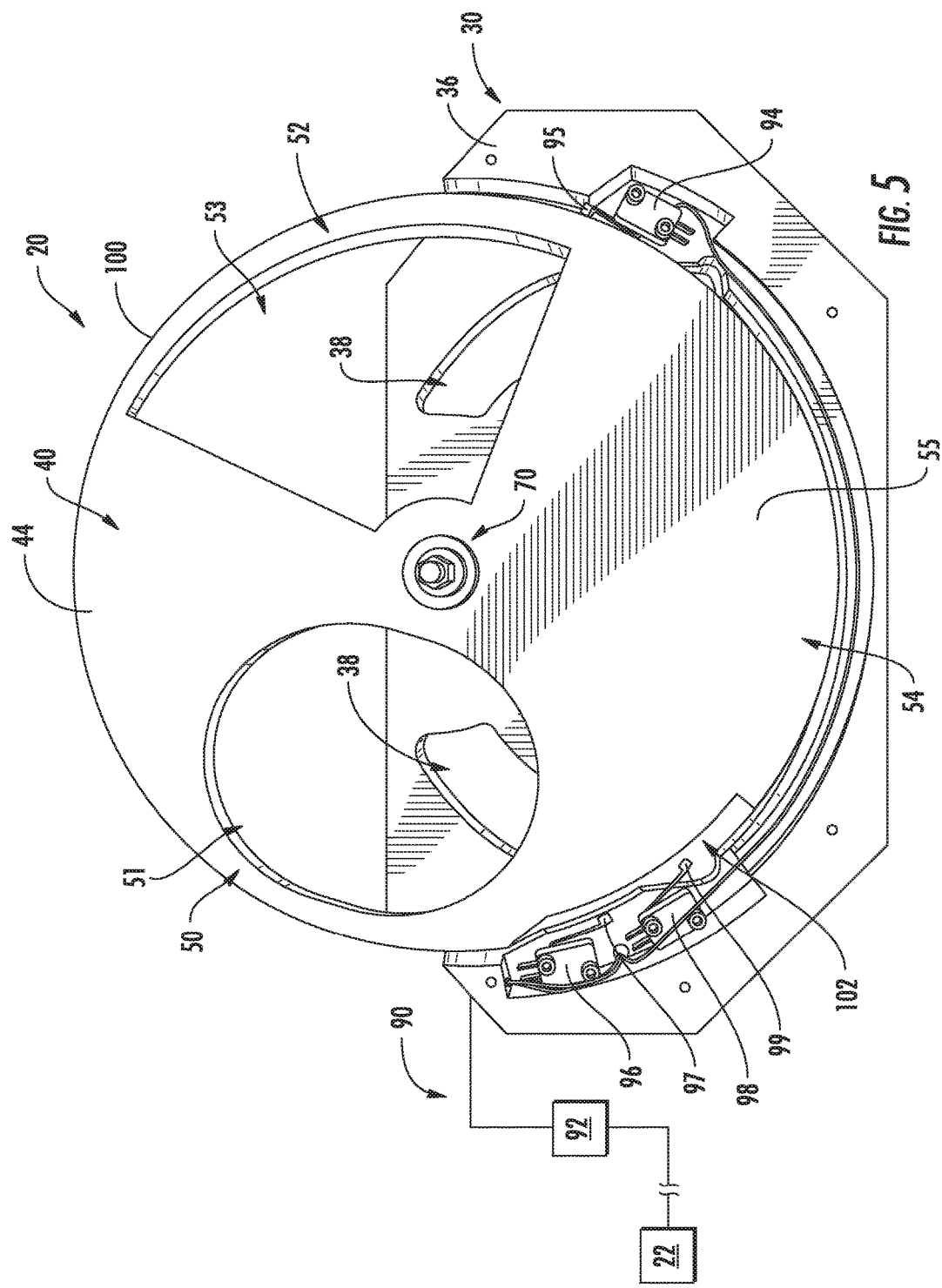
FIG. 5 is a rear view of components of a blast gate, with a portion of the chassis removed for illustrative purposes and a gate in a second position, in accordance with embodiments of the present disclosure.
Figure 6:
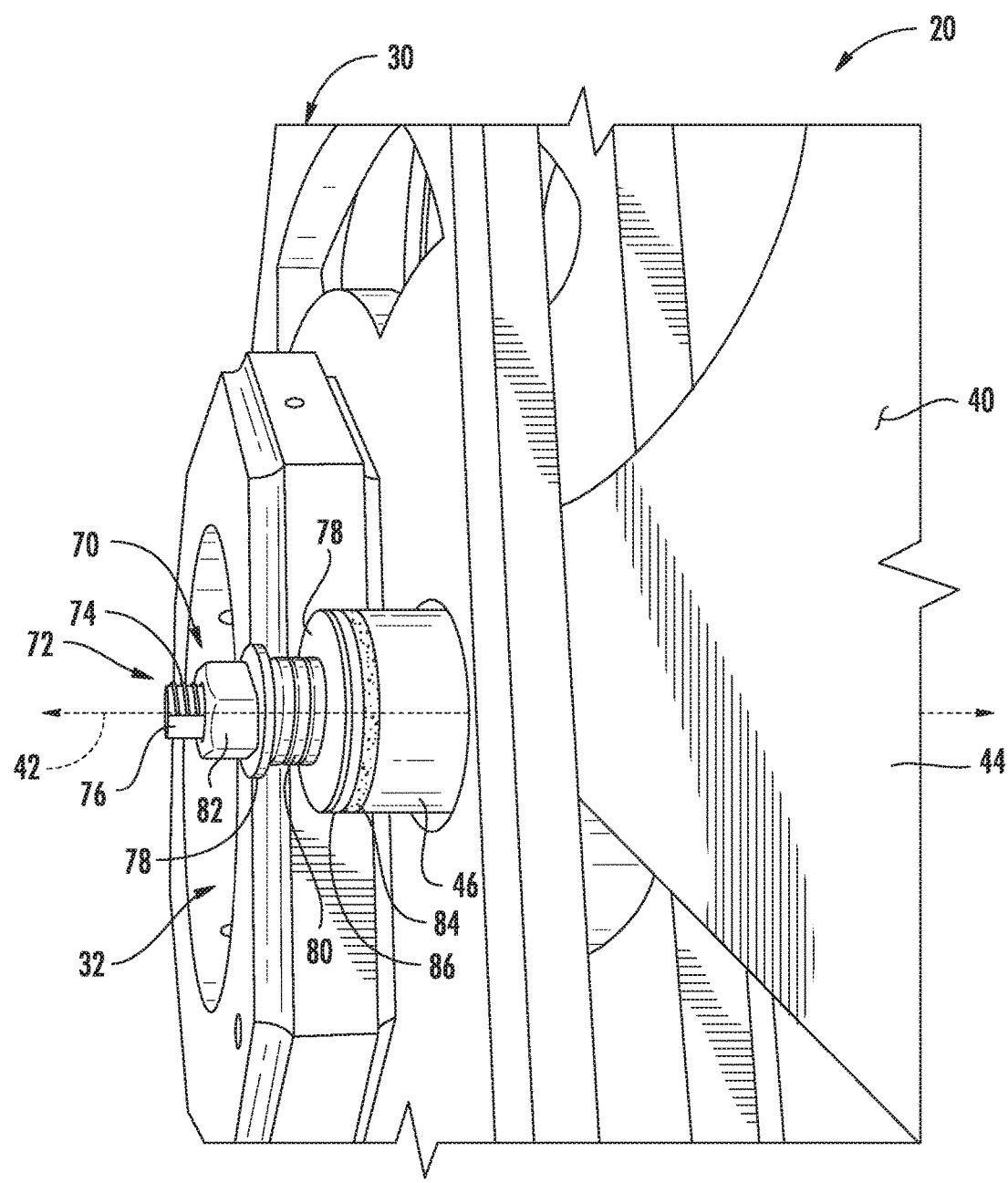
FIG. 6 is a side perspective view of a portion of a blast gate, including components of a clutch assembly, in accordance with embodiments of the present disclosure.
Figure 7:
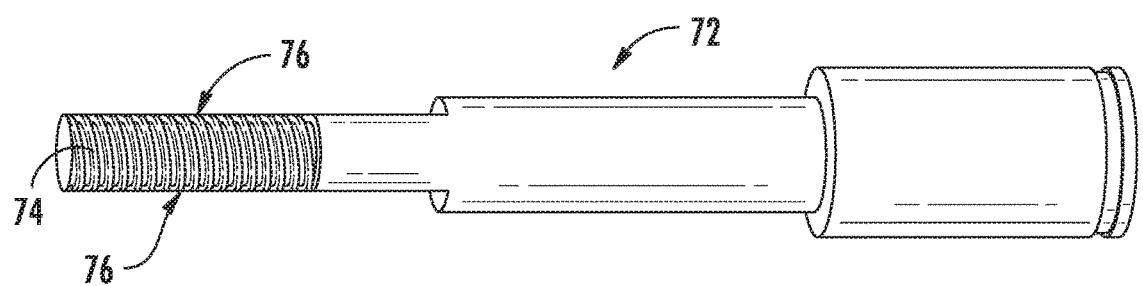
FIG. 7 is a side view of a bolt utilized in a clutch assembly of a blast gate in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, a debris collection system 10 is provided. System 10 includes one or more machines 12 and a vacuum system 14. Any suitable machines 12 may be utilized, including saws, sanders, and other suitable wood or metal working machines 12 which produce dust, metal shavings, and other debris. In the embodiment of FIG. 1, such machines 12 include saws of various sizes and types, rollers, lathes, band saws, etc., as well as a floor sweep that brings the vacuum suction force adjacent the floor so that debris may be swept towards a nozzle of the floor sweep and taken up. The vacuum system 14 may include a vacuum 16 and a plurality of ducts 18. One of the plurality of ducts 16 may be connected to each machine 12 in the system 10 to collect debris from the machine 12 during operation. When activated, debris generated by a machine 12 may be flowed through the associated duct 18 and vacuum system 14 generally to the vacuum 16.

As illustrated, a blast gate 20 may be provided on each duct 18 that is connected to a machine 12. Each blast gate 20 may be movable between an open position and a closed position. In the open position, the suction force generated by the vacuum may be transmitted in the duct 16 past the blast gate 20 and to the associated machine 12, to cause the flow of debris through the duct 16. In the closed position, blast gate 20 may block this transmission of the suction force. Typically, blast gates 20 associated with machines 12 not currently in use are kept in the closed position, and blast gates 20 associated with machines 12 currently in use are moved to the open position, to consolidate the vacuum suction force to the machines 12 currently generating debris.

Vacuum 16 and vacuum system 14 may be powered by a suitable power source 22, which in exemplary embodiments may be an electrical power source 22. Further, one or more main switches 24 may be provided to selectively activate and deactivate the vacuum system 14. For example, a main switch 24 may be provided at each machine 12. In some embodiments, a main switch 24 may activate the vacuum system 14 but the associated machine 12 at which the main switch 24 is provided may be activated independently, while in other embodiments a main switch 24 may activate both the vacuum system 14 and the machine 12 at which the main switch 24 is provided.

Referring now to FIGS. 2 through 7, embodiments of blast gate 20 in accordance with the present disclosure are provided. Blast gates 20 in accordance with the present disclosure advantageously reduce debris build-up and clogging through mechanical scrubbing at the end of a period of operation of the vacuum 16 and an associated machine 12. Such mechanical scrubbing is provided via operation of a gate in conjunction with activation and deactivation of the vacuum 16 as discussed herein.

As illustrated, blast gate 20 includes a chassis 30 which is connectable to a duct 18. The chassis 30 may define a flow passage 32 therethrough. When connected to the duct 18, the flow passage 32 may align with the duct 18 such that air flow generated by the vacuum suction force and flowing through a passage of the duct flows through flow passage 32 of chassis 30 (when unobstructed by a gate of the blast gate 20 as discussed herein).

In exemplary embodiments, chassis 30 may include multiple panels, such as first panel 34 and a second panel 36. The first panel 34 and second panel 36 may be spaced apart from each other, such as along a central axis 42 as discussed herein. The panels 34, 36 and chassis 30 generally may be connected to and support a gate 40 of the blast gate 20. Each panel 34, 36 may define the flow passage 32 therethrough.

In exemplary embodiments, one or more relief apertures 38 may be defined in the chassis 30. For example, one or more relief apertures 38 may be defined in each panel 34, 36. The relief apertures 38 may generally surround and be spaced from the flow passage 32, and may advantageously provide flow paths for air moving past the blast gate 20 during operation of the vacuum system 14. The use of such relief apertures 38 may advantageously facilitate improved operation of the blast gate 20 by causing improved sealing of the various components of the blast gate 20 together with each other and the duct 18 during operation of the vacuum system 14.

In exemplary embodiments, blast gate 20 is formed from a suitable phenol. Alternatively, however, other suitable materials may be utilized, such as suitable polymers, metals, etc.

As discussed, a blast gate 20 may additionally include a gate 40 which is rotatable about a central axis 42. In exemplary embodiments, gate 40 has a generally round, circular shape. The gate 40 may be connected, such as rotatably connected, to the chassis 30. For example, in exemplary embodiments as illustrated, the gate 40 may include a body 44 and a shaft 46 extending from the body 44 along and defining the central axis 42. The shaft 46 may thus for example be coaxial with the central axis 42. The shaft 46 may be rotatably connected to the chassis 30, such as by extending through connector holes 39 defined in chassis 30 (and panels 34, 36 thereof).

The gate 40 may be selectively rotatable about the central axis 42 to selectively obstruct or allow flow through the flow passage 32. Accordingly, the gate 40 in exemplary embodiments is disposed between the panels 34, 36 along the central axis 42. Further, in exemplary embodiments, the gate 40 may be formed from a suitable polyamide, which may advantageously facilitate rotation with reduced friction due to contact with the chassis 30. Alternatively, however, other suitable materials, such as other polymers or metals, may be utilized.

The gate 40, such as the body 44 thereof, may include various portions which are spaced apart circumferentially about the central axis 42. For example, a first portion 50, an intermediate portion 52, and a second portion 54 may be provided and spaced apart circumferentially about the central axis 42. The first portion 50 may include a flow aperture 51 that is defined in the gate 40 (i.e. in the body 44), and the intermediate portion 52 may include one or more auxiliary flow apertures 53 that are defined in the gate 40 (i.e. in the body 44). When a plurality of auxiliary flow apertures 53 are provided, the apertures 53 may be spaced apart from each other circumferentially about the central axis 42 and all disposed within the intermediate portion 52 between the first and second portions 50, 54. The second portion 54 may include a partition 55, which may for example simply be a section of the body 44 which may be selectively aligned with the flow passage 32 as discussed herein.

Each of the first portion 50, second portion 54 and intermediate portion 52 may be selectively rotatable into fluid alignment with the flow passage 32. When in fluid alignment, at least some of a portion 50, 52, 54 may be in the path of air and debris flow through the flow passage 32 and associated duct 18. Specifically, when the first portion 50 is in fluid alignment with the flow passage 32, the flow aperture 51 may be in the path of air and debris flow through the flow passage 32 and associated duct 18 such that the air and debris flow through the flow aperture 51. When the intermediate portion 52 is in fluid alignment with the flow passage 32, an auxiliary flow aperture 53 may be in the path of air and debris flow through the flow passage 32 and associated duct 18 such that the air and debris flow through the flow aperture 53. When the second portion 54 is in fluid alignment with the flow passage 32, the partition 55 may be in the path of air and debris flow through the flow passage 32 and associated duct 18, obstructing the flow passage 32 and blocking such flow therepast.

The gate 40 may be fully (i.e. 360 degrees) rotatable about the central axis 42. Rotation may, in exemplary embodiments, occur in only a single direction (i.e. either counterclockwise or clockwise but not both). A motor 60 may be provided for facilitating such rotation. The motor 60 may be connected to the gate 40 and selectively operable to rotate the gate 40 about the central axis 42. Any suitable motor 60 may be utilized. In exemplary embodiments, motor 60 may operate at between approximately 12 and approximately 15 revolutions per minute. The motor 60 may be activated and deactivated as discussed herein to cause rotation of the gate 40.

As discussed, motor 60 may be connected to the gate 40. In exemplary embodiments, the motor 60 may be connected to the shaft 46. For example, a clutch assembly 70 may connect the motor 60 and gate 40, such as the shaft 46 thereof, together. The clutch assembly 70 may include, for example, a bolt 72. The bolt 72 may extend, such as along the central axis 42, through a central bore hole 48 that is defined in the shaft 46 and which may extend along and be coaxial with the central axis 42. The bolt 72 may be coupled at a first end to the motor 70, such that operation of the motor 70 causes rotation of the bolt 72.

Bolt 72 may include an exterior thread 74 extending along the exterior surface of the bolt 72 and from a second opposite end thereof. Further, in exemplary embodiments, bolt 72 may include opposing planer sidewalls 76. The planer sidewalls 76 may be portions of the exterior surface extending from the second end of the bolt 72, and may for example be formed by cutting away portions of the bolt 72. The planer sidewalls 76 may facilitate a safety feature of the blast gate 20 by allowing the bolt 72 to slip during rotation relative to the gate 40 if a significant force is being provided against the gate 40 opposite the direction of rotation thereof. Accordingly, the gate 40 will not continue to rotate and potentially crush or damage the object providing the opposing force.

Clutch assembly 70 may further include, for example, one or more washers 78, springs 80 (i.e. compression springs), and nuts 82. The washers 78 and springs 80 may be provided on the bolt 72, and the nut 82 may be coupled to the bolt 72, adjacent the second end of the bolt 72. Such components may connect the bolt 72 to the gate 40, such as to the shaft 46 thereof, such that rotation of the bolt 72 rotates the gate 40.

Further, in exemplary embodiments, clutch assembly 70 may include a slip member 84 (which may for example be formed from cork) and/or a rubber bearing 86 (which may for example be formed from neoprene). The slip member 84 and rubber bearing 86 may each be generally ring-shaped, and may be provided on the bolt 72 adjacent the second end of the bolt 72. The slip member 84 may contact the central shaft 46, and the rubber bearing 86 may contact the slip member 84 such that the slip member 84 is sandwiched between the central shaft 46 and the rubber bearing 86. The slip member 84 may provide a friction fit-style contact with the central shaft 46, such that rotational force from the bolt 72 is transmitted through the slip member 84 to the shaft 46 and gate 40 generally. Similar to the planer sidewalls 76, the slip member 84 may facilitate a safety feature of the blast gate 20 by allowing the bolt 72 to slip during rotation relative to the gate 40 if a significant force is being provided against the gate 40 opposite the direction of rotation thereof. Accordingly, the gate 40 will not continue to rotate and potentially crush or damage the object providing the opposing force.

Gate 40 may be rotatable (i.e. via motor 60) to and between various positions. For example, gate 40 may be rotatable between stationary first position (see FIG. 4) and a stationary second position (see FIG. 5). In the stationary first position, the gate 40 is stationary (and motor 60 is not active) and the first portion 50 is in fluid alignment with the flow passage 32 as discussed herein. In the stationary second position, the gate 40 is stationary (and motor 60 is not active) and the second portion 54 is in fluid alignment with the flow passage 32 as discussed herein. Gate 40 may further be rotatable between these positions (and specifically from the first position to the second position) through an intermediate position wherein the intermediate portion 52 is in fluid alignment with the flow passage 32 as discussed herein. Such fluid alignment may occur during rotation from the first position to the second position, and may thus be alignment during rotation (when motor 60 is active) rather than stationary alignment as occurs in the first and second positions.

Rotation of the gate 40 as described herein may occur at specified times during operation of the vacuum system 14 and debris collection system 10 generally. For example, when the vacuum system 14 is activated (such as when an associated machine 12 is activated, such as via operation of main switch 24), vacuum 16 may be activated and the gate 40 associated with the activated machine 12 may rotate to the first position (such as from the second position). Such rotation may, for example, be caused by activation of the machine 12 and/or vacuum system 14. The gate 40 may remain in this position during use of the machine 12 and vacuum 16. When the vacuum system 14 is deactivated (such as when an associated machine 12 is deactivated, such as via operation of main switch 24), the gate 40 may rotate from the first position through the intermediate position to the second position. Notably, the vacuum 16 may remain initially activated during such rotation even though the machine 12 and vacuum system 14 have been deactivated, and may be deactivated once the gate 40 reaches the second position. Such rotation and use of the intermediate position may advantageously facilitate the mechanical scrubbing as discussed herein, thus reducing debris build-up and clogging.

In exemplary embodiments, an electrical assembly 90 may be provided in electrical communication with the motor 60 for facilitating such rotation of the gate 40 and operation of the system 14 as discussed herein. The electrical assembly 90 may, for example, be in electrical communication between the main switch 24 and the motor 60. Electrical assembly 90 may include a relay 92 and a plurality of switches.

Each of the plurality of switches operable by the gate 40 during movement thereof. For example, each switch may include a contact arm which is selectively contactable by the gate 40. As shown, the plurality of switches may include a first switch 94 (with associated contact arm 95), a second switch 96 (with associated contact arm 97), and a vacuum switch 98 (with associated contact arm 99). In exemplary embodiments, each switch 94, 96, 98, such as the contact arms 95, 97, 99 thereof, is selectively contactable with a peripheral edge 100 of the gate 40. Gate 40 may further define a cut-away 102 which extends inward from the peripheral edge 100. The cut-away 102 may cause the switches 94, 96, 98, such as the contact arms 95, 97, 99 thereof, to not contact the peripheral edge 100, such that the contact is selective. Each switch 94, 96, 98, such as the contact arm 95, 97, 99 thereof, may thus contact the peripheral edge 100 as it rotates therepast and not contact the peripheral edge 100 as the cut-away 102 rotates therepast. A switch may be open when not in contact with the peripheral edge 100 and closed when in contact with the peripheral edge 100.

Operation of the switches 94, 96, 98 and relay 92 may govern rotation of the gate 40 during operation of the systems 10, 14. The relay 92 may, for example, be closed when the system 14 is not activated. Additionally, the switches 96, 98 may be open but the switch 94 may be closed. Activation of the system 14 (i.e. via operation of main switch 24) may cause the relay 92 to open. When the relay 92 opens, this electrical circuit may cause activation of the vacuum 16 and rotation of the gate 40 until the switch 94 is opened (and the switches 96, 98 are closed). When switch 94 is opened (and switches 96, 98 are closed), the gate 40 may have reached the first position and active rotation may thus cease. Deactivation of the system 14 (i.e. via operation of main switch 24) may cause the relay 92 to close. When the relay 92 closes, this electrical circuit may cause rotation of the gate 40 until the switch 94 is closed (and the switches 96, 98 are opened). When switch 94 is closed and switch 96 is opened, the gate 40 may have reached the second position and active rotation may thus cease. When switch 98 is opened (for example due to continued passive rotation after active rotation ceases) the vacuum 16 may be deactivated.

Notably, the switches 94, 96, 98 and cut-away portion 102 may be positioned such that opening and closing of the switches 94, 96, 98 occur at the times desired to facilitate the above-described positioning of the gate 40.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A blast gate for a vacuum system, the vacuum system comprising a duct, the blast gate comprising:
    a chassis connectable to the duct and defining a flow passage therethrough;
    a gate connected to the chassis and rotatable about a central axis, the gate comprising a first portion, an intermediate portion and a second portion spaced apart circumferentially about the central axis, the first portion defining a flow aperture, the intermediate portion defining an auxiliary flow aperture, the second portion comprising a partition, each of the first portion, second portion and intermedidate portion selectively rotatable into fluid alignment with the flow passage;
    a motor connected to the gate and selectively operable to rotate the gate about the central axis; and
    a clutch assembly connecting the motor to the gate, the clutch assembly comprising a bolt, a washer, a spring, and a nut;
    wherein the gate is rotatable between a stationary first position wherein the first portion is in fluid alignment with the flow passage and a stationary second position wherein the second portion is in fluid alignment with the flow passage, and wherein the gate is rotatable through an intermediate position wherein the intermediate portion is in fluid alignment with the flow passage during rotation from the first position to the second position.

2. The blast gate of claim 1, wherein the auxiliary flow aperture is a plurality of auxiliary flow apertures.

3. The blast gate of claim 1, wherein the chassis comprises a front panel and a rear panel, and wherein the gate is disposed between the front panel and the rear panel along the central axis.

4. The blast gate of claim 1, wherein a relief aperture is defined in the gate.

5. The blast gate of claim 1, further comprising an electrical assembly in electrical communication with the motor, the electrical assembly comprising a relay and a plurality of switches.

6. The Mast gate of claim 5, wherein each of the plurality of switches comprises a contact arm, the contact arm of each of the plurality of switches selectively contactable with the gate.

7. The blast gate of claim 6, wherein the contact arm of each of the plurality of switches is selectively contactable with a peripheral edge of the gate.

8. The blast gate of claim 7, wherein the gate defines a cut-away extending from the peripheral edge of the gate.

9. The blast gate of claim 5, wherein the plurality of switches comprises a first switch, a second switch, and a vacuum switch.

10. The blast gate of claim 1, wherein the gate is formed from a polyamide.

11. The blast gate of claim 1, wherein the chassis is formed from a phenol.

12. The blast gate of claim 1, wherein the gate comprises a central shaft defining the central axis, and wherein the bolt extends through a central bore hole defined in the central shaft.

13. The blast gate of claim 12, wherein the clutch assembly further comprises a slip member and a rubber bearing, the slip member contacting the central shaft, the rubber bearing contacting the slip member.

14. The blast gate of claim 1, wherein the bolt includes opposing planer sidewalls.

15. A vacuum system, comprising:
   a vacuum;
   a duct; and
   a blast gate connected to the duct, the blast gate comprising:
      a chassis connected to the duct and defining a flow passage therethrough;
      a gate connected to the chassis and rotatable about a central axis, the gate comprising a first portion, an intermediate portion and a second portion spaced apart circumferentially about the central axis, the first portion defining a flow aperture, the intermediate portion defining an auxiliary flow aperture, the second portion comprising a partition, each of the first portion, second portion and intermediate portion selectively rotatable into fluid alignment with the flow passage;
      a motor connected to the gate and selectively operable to rotate the gate about the central axis; and
      an electrical assembly in electrical comunication with the motor, the eletrical assembly comprising a relay and a plurality of switches,
      wherein the gate is rotatable between a stationary first position wherein the first portion is in fluid alignment with the flow passage and a stationary second position wherein the second portion is in fluid alignment with the flow passage, and wherein the gate is rotatable through an intermediate position wherein the intermediate portion is in fluid alignment with the flow passage during rotation from the first position to the second position.

16. A blast gate for a vacuum system, the vacuum system comprising a duct, the blast gate comprising:
   a chassis connectable to the duct and defining a flow passage therethrough;
   a gate connected to the chassis and rotatable about a central axis, the gate comprising a first portion, an intermediate portion and a second portion spaced apart circumferentially about the central axis, the first portion defining a flow aperture, the intermediate portion defining an auxiliary flow aperture, the second portion comprising a partition, each of the first portion, second portion and intermediate portion selectively rotatable into fluid alignment with the flow passage;
   a motor connected to the gate and selectively operable to rotate the gate about the central axis; and
   an electrical assembly in electrical communication with the motor, the electrical assembly comprising a relay and a plurality of switches, each of the plurality of switches comprising a contact arm, the contact arm of each of the plurality of switches selectively contactable with a peripheral edge of the gate;
   wherein the gate is rotatable between a stationary first position wherein the first portion is in fluid alignment with the flow passage and a stationary second position wherein the second portion is in fluid alignment with the flow passage, and wherein the gate is rotatable through an intermediate position wherein the intermediate portion is in fluid alignment with the flow passage during rotation from the first position to the second position.

17. The blast gate of claim 16, wherein the chassis comprises a front panel and a rear panel, and wherein the gate is disposed between the front panel and the rear panel along the central axis.

18. The blast gate of claim 16, wherein a relief aperture is defined in the gate.

19. The blast gate of claim 16, further comprising a clutch assembly connecting the motor to the gate, the clutch assembly comprising a bolt, a washer, a spring, and a nut.

* * * * *